United States Patent
Dega

[15] 3,670,560
[45] June 20, 1972

[54] FLUIDIC SYSTEM FOR EVALUATING PHYSICAL CHARACTERISTICS

[72] Inventor: Fred W. Dega, Oak Park, Mich.
[73] Assignee: General Motors Corporation, Detroit, Mich.
[22] Filed: Aug. 26, 1970
[21] Appl. No.: 67,161

[52] U.S. Cl. ............................................. 73/37, 73/37.9
[51] Int. Cl. ............................... G01b 13/02, G01b 13/10
[58] Field of Search .............. 73/37, 37.5, 37.8, 37.9, 49.1, 73/49.2, 49.3; 33/DIG. 2

[56] References Cited

UNITED STATES PATENTS 3,577,766   5/1971   Walker .................................. 73/37.9

Primary Examiner—Louis R. Prince
Assistant Examiner—William A. Henry, II
Attorney—W. E. Finken, A. M. Heiter and D. F. Scherer

[57] ABSTRACT

A fluidic system for evaluating the physical characteristics of an article within upper and lower limits. The system includes a fixture in which the article to be measured is placed, a source of fluid pressure which delivers fluid to the fixture, a plurality of fluidic amplifiers, a pair of interface signal devices and a pair of indicators. Pressure signals resulting from fluid flow past the article in the fixture are conducted to the signal devices which emit control signals to actuate the fluidic amplifiers. The output of two of the fluidic amplifiers are in fluid communication with the indicators and function to selectively actuate the indicators in response to the fluid pressure in the fixture and the signals emitted by the signal device.

7 Claims, 3 Drawing Figures

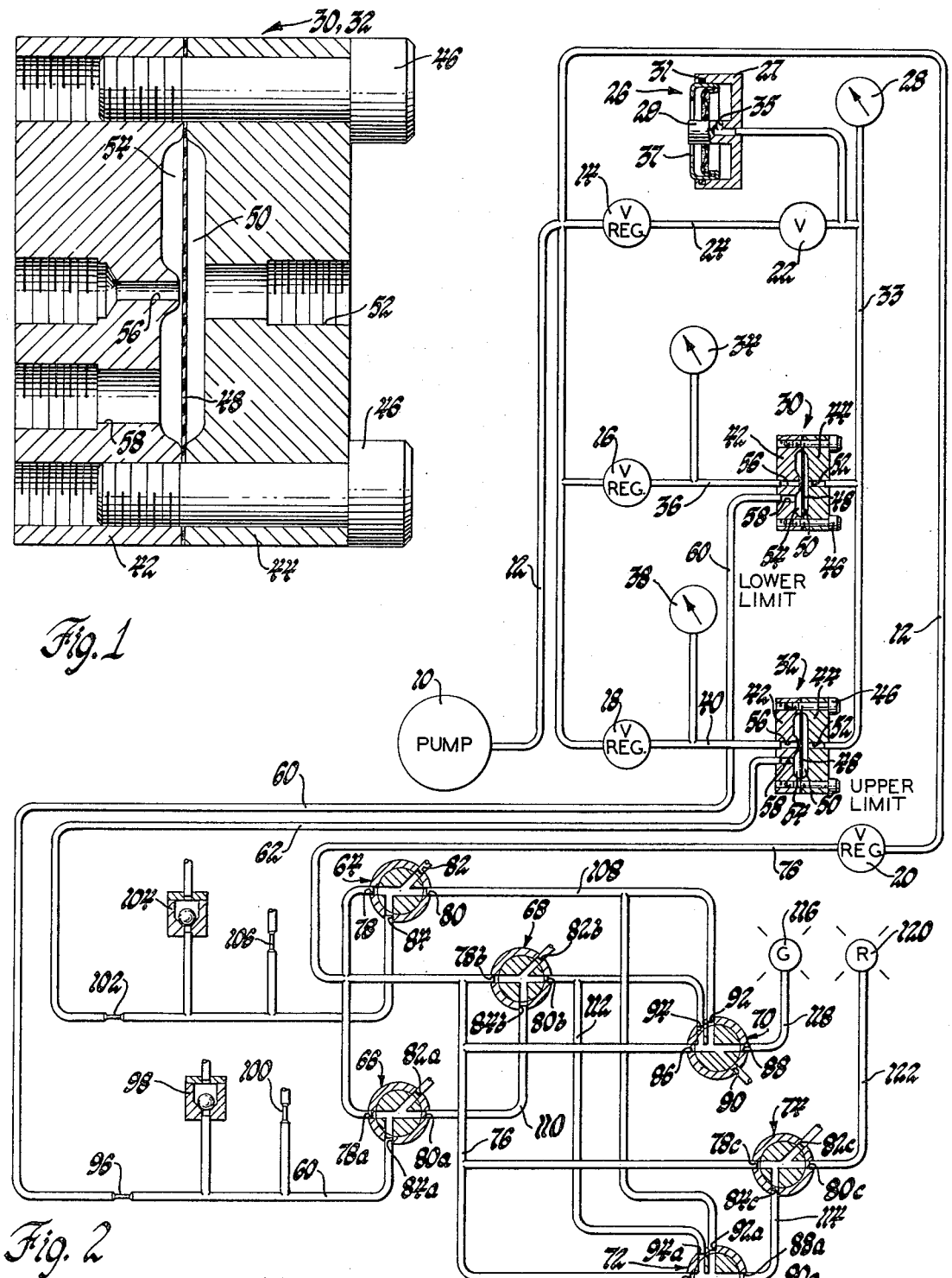
Fig. 1
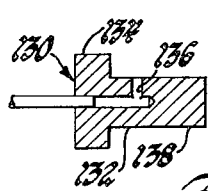
Fig. 3
Fig. 2
INVENTOR.
Fred W. Dega
BY
Donald F. Scherer
ATTORNEY

FLUIDIC SYSTEM FOR EVALUATING PHYSICAL CHARACTERISTICS

This invention relates to measuring devices and more particularly to fluidic control systems for devices measuring upper and lower limits of acceptability.

The present invention has two indicators, one of which is actuated when the article being tested is outside the upper or lower limit of acceptability and the other is actuated when the article to be tested is within the upper and lower limits of acceptability. This permits a rapid determination by the operator regarding the acceptability of the article tested. The indicators are actuated by a pair of monostable fluid amplifiers which receive a power input from a fluid source and control inputs from a plurality of monostable fluid amplifiers. The fluid amplifiers would supply the control signals, receive the power input from the fluid source and are actuated by control inputs which are received from a pair of interface signal devices.

The interface signal devices include a housing having a pair of chambers separated by a diaphragm. One of the chambers receives a pressure signal proportional to the measurement being taken on the article and the other chamber receives a controlled pressure input from the pressure source. One of the interface devices emits a signal from the control pressure chamber whenever the pressure on the test pressure chamber is at or below the upper limit of acceptability and does not emit a signal when the pressure in the test pressure chamber is above the upper limit of acceptability. The other interface device emits a signal from the control pressure chamber whenever the pressure in the test pressure chamber is at or below the lower limit of acceptability and does not emit a signal when the test pressure is above the lower limit.

It is an object of this invention to provide in an improved control system for a physical characteristic measuring device, a test fixture adapted to receive an article to be measured and emit a pressure signal reflecting the measurement taken, a pair of interface signal devices in fluid communication with the test fixture for selectively emitting control signals in response to the signal emitted by the test fixture, a plurality of fluid amplifiers controlled by signals from the interface device which amplifiers are selectively actuated by control signals to provide selective actuation of a pair of indicators.

This and other objects and advantages of the present invention will be more apparent from the following description and drawings in which:

FIG. 1 is a cross-sectional elevational view of the interface signal device;

FIG. 2 is a diagrammatic representation of the control system; and

FIG. 3 is a cross-sectional view of a test fixture.

Referring to the drawings wherein like characters designate like or corresponding parts, there is shown a conventional fluid pump 10 supplying fluid pressure through a passage 12 which is connected with four conventional downstream pressure regulators or reducing valves 14, 16, 18 and 20. The regulator valve 14 is in fluid communication with a conventional flow control valve 22 via passage 24 which flow control valve 22 is in fluid communication with a test fixture generally designated 26, a pressure gage 28, a lower limit signal interface device generally indicated 30 and an upper limit interface signal device generally indicated 32 by a passage 33.

The test fixture 26 has a cup shaped housing 27. A central shaft portion 29 extends from the base of the housing 27. A fixture seal 31 is located in the inner circumference of the housing 27. The shaft portion 29 has a central passage 35 in fluid communication with the passage 33. The article to be tested such as a lip seal 37, is placed in the housing 27 with the outer circumference of the lip seal 37 abutting the seal 31 and the lip of the seal 37 abutting the shaft 29. The fit between the fixture seal 31 and the lip seal 37 is sufficiently tight to prevent the flow of fluid, so that fluid, conducted through passage 35, must pass between the lip of seal 37 and the shaft 29. The pressure required to force the fluid between the lip and the shaft 29 is reflected in passage 33. The fluid flowing past the lip seal 37 is released to atmosphere.

The regulator valve 16 is in fluid communication with the lower limit signal device 30 and a pressure gage 34 via passage 36. The regulator valve 18 is in fluid communication with the upper limit interface device 32 and a pressure gage 38 via a passage 40.

The signal devices 30 and 32 are identical in structure and are shown in FIG. 1. These devices include a housing having two components 42 and 44 secured together by a plurality of threaded fasteners 46 and separated by a flexible diaphragm 48. The component 44 has a test chamber 50 adjacent the diaphragm 48 and is in fluid communication via passage 52 with the passage 34. The component 42 has a signal chamber 54 which is in fluid communication with a pair of fluid passages 56 and 58. The passage 56 of the lower limit device 30 is in fluid communication with the passage 36 while the passage 56 of the upper limit device 32 is in fluid communication with the passage 40. The passages 58 of the lower and upper devices 30 and 32 are in fluid communication with passages 60 and 62 respectively. The interface signal device functions such that when the fluid pressure in chamber 50 exceeds the fluid pressure in chamber 54 the passage 56 is closed by the diaphragm 48 so that no signal pressure is available in passage 58. When the fluid pressure in chamber 54 exceeds the fluid pressure in chamber 50 the diaphragm 48 opens the passage 56 to permit fluid communication between passages 56 and 58.

The pressure regulator valve 20 is in fluid communication with a plurality of conventional monostable fluid amplifiers 64, 66, 68, 70, 72 and 74 via a passage 76. The fluid amplifier 64 has a power input port 78 which is connected with the passage 76, a pair of power output ports 80 and 82 and a control port 84. The fluid amplifiers 66, 68 and 74 are similar in construction to the fluid amplifier 64 such that corresponding parts have been given the same numerical designation with an a, b and c suffix respectively. The fluid amplifier 70 has a power input port 86, a pair of power output ports 88 and 90 and a pair of control ports 92 and 94 respectively. The power input port 86 is connected with the passage 76. The fluid amplifier 72 is similar in construction with the fluid amplifier 70 such that corresponding components have been given the same numerical designation with an a suffix.

The passage 60 is in fluid communication through a restriction 96 with the control port 84a of amplifier 66, a check valve or diode 98 and a restriction 100. The passage 62 is in fluid communication through a restriction 102 with the control port 84 of amplifier 64, a check valve or diode 104 and a restriction 106.

The restrictions 96 and 102 limit the flow of fluid to the control ports 84a and 84 and the check valves 98 and 104 limit the fluid pressure at the control ports. The restrictions 100 and 106 are smaller in diameter and the restrictions 96 and 102 respectively and are in fluid communication with the atmosphere to permit the passages 60 and 62 to be exhausted whenever the passages 58 of the lower limit and upper limit signal devices 30 and 32 are not pressurized. This removes the control signals from ports 84a and 84 respectively.

The output ports 82, 82a, 82b and 82c of amplifiers 64, 66, 68, and 74 and the output ports 90 and 90a of amplifiers 70 and 72 are vented to atmosphere. The output portion 80 of fluid amplifier 64 is connected with the passage 108 which is connected to control ports 92 and 92a of the fluid amplifiers 70 and 72 respectively. The output port 80a of amplifier 66 is in fluid communication with control port 84b of amplifier 68 via passage 110. The output port 80b of amplifier 68 is in fluid communication with control ports 94 and 94a of amplifier 70 and 72 via passage 112. The output port 88a of amplifier 72 is in fluid communication with control port 84c of amplifier 74 via passage 114. The output port 88 of amplifier 70 is in fluid communication with an indicator 116 via passage 118 and the output port 80c of amplifier 74 is in fluid communication with an indicator 120 via passage 122.

The fluid amplifiers are of the monostable type that is, they have a preferred output when no control signal is present. All of the fluid amplifiers are set such that when a control signal is present the amplifier output is exhausted or directed to atmosphere. When the amplifiers are in their normal operating condition, that is, no control signals are present, the amplifiers will be indicated as being on. When a control signal is present the amplifiers will be indicated as being off.

The system described above is particularly suited to measure the lip opening pressure of a lip seal. To measure the lip opening pressure the seal is placed on the test fixture 26 in such a manner that it restricts the flow of air pressure from the test fixture and thereby creates pressure in the passage 33 which is conducted to the lower and upper limit signal devices 30 and 32. A typical set of values for such a test is as follows: The test fixture 26 is closed and the regulator valve 14 is adjusted to provide 30 psi in the fixture. The fixture is opened and the flow control valve 22 is adjusted to permit a flow of 10,000 cc/m of fluid. The regulator valve 16 is adjusted to produce 5 psi when the lower limit device 30 is closed and the regulator valve 18 is adjusted to produce 10 psi when the upper limit device 32 is closed. The gages 28, 34 and 38 provide the operator with a visual indication of the desired pressures. The diodes or check valves 98 or 104 are adjusted to control the pressure in the passages 60, 62 at a maximum of 3 psi. With the system running a seal is placed on the test fixture. The back pressure caused by the flow of air to the seal will cause pressure to develop in passage 33. This pressure will reflect three conditions. The lip seal opening pressure is low, the lip seal opening pressure is within acceptable limits, or the lip seal opening pressure is high.

If the lip seal opening pressure is low the pressure in passage 33 will be below 5 psi. Therefore, the pressure in the signal devices 30 and 32 will be below 5 psi so that a control signal is emitted by both of the signal devices. The control signal from the lower limit device 30 will cause the amplifier 66 to turn off so that no control signal will be present in passage 110. When there is no control pressure in passage 110 the amplifier 68 will be on so that control pressure will be present in passage 112 which will turn the amplifiers 70 and 72 off. With the amplifier 70 turned off the indicator 116 will not be actuated. With the amplifier 72 turned off there will be no control signal in passage 114. With no control signal in passage 114 the amplifier 74 will be on thereby actuating the indicator 120 which indicates the seal is outside the acceptable limits. The control signal emitted by the upper limit signal device 32 has no effect on the control system at this time.

If the pressure at the test seal is above 5 psi and below 10 psi, the passage 60 will not be pressurized but the passage 62 will be pressurized. When the passage 62 is pressurized the amplifier 64 is turned off so that no control signal is present in passage 108. The amplifier 66 will be on since there is no control pressure in passage 60 which will cause the amplifier 68 to turn off so that there will be no control pressure in passage 112. Since there is no control pressure in passage 108 or 112 the amplifiers 70 and 72 will be turned on. With the amplifier 72 on the amplifier 74 is turned off. The indicator 116 is actuated by amplifier 70 indicating the test seal is within the acceptable limits.

If the lip opening pressure of the test seal exceeds 10 psi both the lower and upper signal devices 30 and 32 will be off or closed so that no pressure signals are present in passages 60 and 62. With this condition the amplifiers 64 and 66 will be on. The amplifier 68 will be off. The amplifiers 70 and 72 will be turned off by the amplifier 64 and the amplifier 74 will be on thereby actuating the indicator 120 to indicate the test seal is outside the acceptable limits. The control system can be adjusted to provide various ranges of acceptability as described above.

The system may also be used to test a variety of components such as shaft diameters, bore diameters and flow control devices.

A typical plug fixture 130 is shown in FIG. 3. The fixture 130 has a stepped outer diameter 132, 134 and a central passage 136 which is in fluid communication with the circumference 138 of the smaller diameter 132. The fixture 130 is adapted to fit a bore to measure whether the bore is within an acceptable range. With the smaller diameter 132 placed in the bore fluid pressure is conducted to the passage 136. The fluid passes between the diameter 132 and the bore to atmosphere. The pressure required to force the fluid to flow is indicative of the bore diameter.

Obviously, many modifications and variations are possible in light of the above description and drawings. Therefore, it should be understood that within the scope of the appended claims the invention may be practiced otherwise than is specifically described.

What is claimed is:

1. A fluidic system for measuring the physical characteristics of an article within upper and lower limits comprising a fluid pressure source; fixture means adapted to receive the article to be measured and being in fluid communication with said source; upper and lower limit signal means in fluid communication with said source and said fixture means for selectively emitting signals in response to the fluid pressure at said fixture means; a plurality of fluid amplifier means in fluid communication with said source and being selectively actuated in response to the signals emitted by said signal means; first indicator means in fluid communication with and responsive to the output of one of said fluid amplifier means for indicating the article being measured is outside the upper or lower limit; and second indicator means in fluid communication with and responsive to the output of another of said fluid amplifiers means for indicating the article being measured is within the upper and lower limits.

2. A fluidic system for measuring an article within upper and lower limits comprising a fluid pressure source; fixture means adapted to receive the article to be measured and being in fluid communication with said source; upper and lower limit signal means in fluid communication with said source and said fixture means for selectively emitting signals in response to the fluid pressure at said fixture means; first fluid amplifier means in fluid communication with said source and being actuated in response to the signal emitted by said lower limit signal means; second fluid amplifier means in fluid communication with said source and being actuated in response to the signal emitted by said upper limit signal means; third fluid amplifier means in fluid communication with said source and being actuated in response to the output of said first fluid amplifier means; fourth and fifth fluid amplifier means each in fluid communication with said source and each being actuated by the output of said second or third fluid amplifier means; sixth fluid amplifier means in fluid communication with said source and being actuated by the output of said fourth fluid amplifier means; first indicator means in fluid communication with and responsive to the output of said sixth fluid amplifier means for indicating the article being measured is outside the upper or lower limit; and second indicator means in fluid communication with and responsive to the output of said fifth fluid amplifier means for indicating the article being measured is within the upper and lower limits.

3. A fluidic system for measuring an article within upper and lower limits comprising a fluid pressure source; fixture means adapted to receive the article to be measured and being in fluid communication with said source; first signal means having a test chamber in fluid communication with said fixture means and a signal chamber in fluid communication with said source, said first signal means emitting a signal when the pressure in the signal chamber is greater than the pressure in the test chamber; second signal means having a test chamber in fluid communication with said fixture means and a signal chamber in fluid communication with said source, said second signal means emitting a signal when the pressure in the signal chamber is greater than the pressure in the test chamber; a plurality of fluid amplifier means in fluid communication with said source and being selectively actuated in response to the signals emitted by said signal means; first indicator means in fluid communication with and responsive to the output of one of said fluid amplifier means for indicating the article being measured is outside the upper or lower limits; and second indicator means in fluid communication with and responsive to the output of another of said fluid amplifier means for indicating the article being measured is within the upper and lower limits.

4. A fluidic system for measuring an article within upper and lower limits comprising a fluid pressure source; fixture means adapted to receive the article to be measured and being in fluid communication with said source; first signal means having a test chamber in fluid communication with said fixture means and a signal chamber in fluid communication with said source, said first signal means emitting a signal when the pressure in the signal chamber is greater than the pressure in the test chamber; second signal means having a test chamber in fluid communication with said fixture means and a signal chamber in fluid communication with said source, said second signal means emitting a signal when the pressure in the signal chamber is greater than the pressure in the test chamber; first fluid amplifier means in fluid communication with said source and being actuated in response to the signal emitted by said second signal means; third fluid amplifier means in fluid communication with said source and being actuated in response to the output of said first fluid amplifier means; fourth and fifth fluid amplifier means each in fluid communication with said source and each being actuated by the output of said second or third fluid amplifier means; sixth fluid amplifier means in fluid communication with said source and being actuated by the output of said fourth fluid amplifier means; first indicator means in fluid communication with and responsive to the output of said sixth fluid amplifier means for indicating the article being measured is outside the upper or lower limit; and second indicator means in fluid communication with and responsive to the output of said fifth fluid amplifier means for indicating the article being measured is within the upper and lower limits.

5. A mechanism for measuring the extent a surface of a workpiece is within predetermined limits comprising, in combination: a fixture adapted to receive said surface in mating relation defining a passage of predetermined cross-section with respect thereto when the workpiece is within said limits and a greater or lesser cross-section when the workpiece is above or below said limits, the fixture further having an internal cavity from which air can escape through said passage to the atmosphere; a source of air under pressure connected to said cavity, the source having decreased pressure with increased air flow through the passage; an upper limit signal valve and a lower limit signal valve each defining a fluid passage and operative when actuated to close the same and each connected to said cavity, the lower limit signal valve being actuated at the air pressure corresponding to the passage cross-section greater than the lower limit and the upper limit signal valve being actuated at an air pressure corresponding to a passage cross-section greater than the upper limit, whereby a workpiece within limits actuates one limit signal valve but not the other; first indicator elements effective to produce an indication when either, neither or both of the limit signal valves are actuated, and, second indicator elements effective to produce an indication when one of the limit signal valves is actuated.

6. A mechanism for measuring the extent a surface of a workpiece is within a predetermined limits comprising, in combination: a fixture adapted to receive said surface in mating relation defining a passage of predetermined cross-section with respect thereto when the workpiece is within said limits and a greater or lesser cross-section when the workpiece is above or below said limits, the fixture further having an internal cavity from which air can escape through said passage to the atmosphere; a source of air under pressure connected to said cavity, the source having decreased pressure with increased air flow through the passage; an upper limit signal valve and a lower limit signal valve each defining a fluid passage and operative when actuated to close the same and each connected to said cavity, the lower limit signal valve being actuated at the air pressure corresponding to a passage cross-section greater than the lower limit and the upper limit signal valve being actuated at an air pressure corresponding to a passage cross-section greater than the upper limit, whereby a workpiece within limits actuates one servo valve but not the other; first fluid amplifier means connected to said passage of said lower limit signal valve and said source of air and operative to produce an output signal when said lower limit signal valve is actuated; second fluid amplifier means connected to said passage of said upper limit signal valve and said air source and operative to produce an output signal when said upper limit signal valve is actuated; third fluid amplifier means connected with said first fluid amplifier means and said air source and operative to produce an output signal when said lower limit signal valve is not actuated and the output signal of said first amplifier means is not present; fourth and fifth fluid amplifier means each connected with said second and third fluid amplifier means and said air source and each operative to produce an output signal when neither the output signal from said second fluid amplifier means or the output signal from said third fluid amplifier means is present; sixth fluid amplifier means connected with said fourth fluid amplifier means and said air source and operative to produce an output signal when the output signal from said fourth fluid amplifier means is not present; first indicator means connected with said fifth fluid amplifier means and operable to produce an indication if the surface of the workpiece is within predetermined limits when the output signal of said fifth fluid amplifier means is present; and second indicator means connected with said sixth fluid amplifier means and operable to produce an indication if the surface of the workpiece is outside the predetermined limits when the output signal of said sixth fluid amplifier means is present.

7. A fluidic system for measuring an article within upper and lower limits comprising a fluid pressure source having pressure and volume controls; fixture means adapted to receive the article to be measured and being in fluid communication with said source; and having a passage from which fluid can escape past the article to atmosphere thereby establishing a pressure proportional to the measurement taken; first signal means having a test chamber in fluid communication with said passage and a signal chamber in fluid communication with said source, said first signal means emitting a signal when the pressure in the signal chamber is greater than the pressure in the test chamber; second signal means having a test chamber in fluid communication with said passage and a signal chamber in fluid communication with said source, said second signal means emitting a signal when the pressure in the signal chamber is greater than the pressure in the test chamber; first fluid amplifier means in fluid communication with said source and being actuated in response to the signal emitted by said first signal means; second fluid amplifier means in fluid communication with said source and being actuated in response to the signal emitted by said second signal means; third fluid amplifier means in fluid communication with said source and being actuated in response to the output of said first fluid amplifier means; fourth and fifth fluid amplifier means each in fluid communication with said source and each being actuated by the output of said second or third fluid amplifier means; sixth fluid amplifier means in fluid communication with said source and being actuated by the output of said fourth fluid amplifier means; first indicator means in fluid communication with and responsive to the output of said sixth fluid amplifier means for indicating the article being measured is outside the upper or lower limit; and second indicator means in fluid communication with and responsive to the output of said fifth fluid amplifier means for indicating the article being measured is within the upper and lower limits.

* * * * *

PO-1050
(5/69)

UNITED STATES PATENT OFFICE
CERTIFICATE OF CORRECTION

Patent No. 3,670,560          Dated June 20, 1972

Inventor(s) Fred W. Dega

It is certified that error appears in the above-identified patent and that said Letters Patent are hereby corrected as shown below:

> In the specification, Column 2, line 61, should read --and 72 are vented to atmosphere. The output port 80 of--.
>
> In the claims, Column 4, line 28, should read --responsive to the output of another of said fluid amplifier--.

Signed and sealed this 31st day of October 1972.

(SEAL)
Attest:

EDWARD M. FLETCHER, JR.
Attesting Officer

ROBERT GOTTSCHALK
Commissioner of Patents